Sept. 7, 1948.  S. P. WAGNER  2,448,752
FISHING ROD HOLDER
Filed July 26, 1945
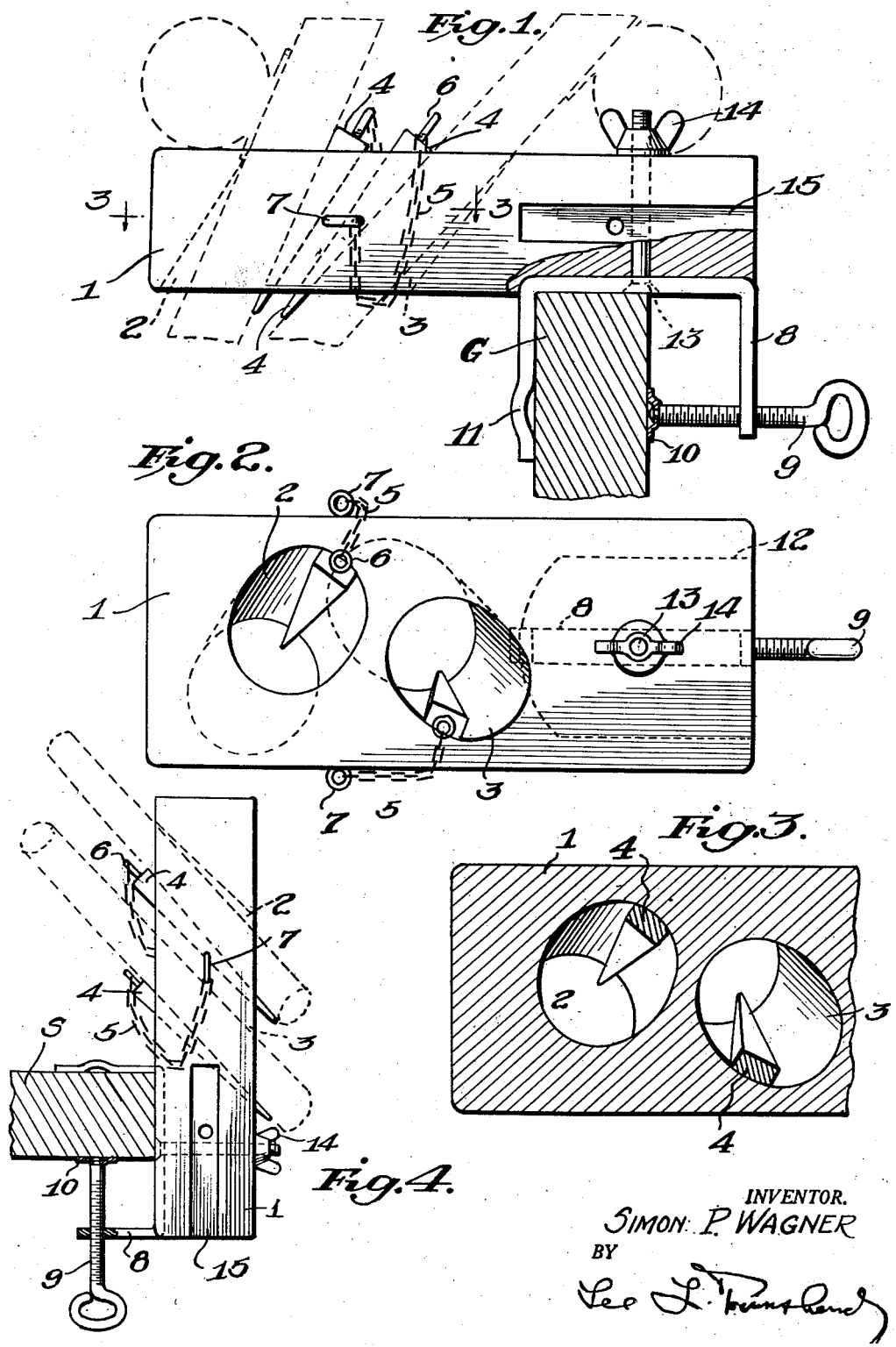
INVENTOR.
SIMON P. WAGNER
BY Patented Sept. 7, 1948

2,448,752

UNITED STATES PATENT OFFICE 2,448,752

FISHING ROD HOLDER

Simon P. Wagner, Rockville, Md.

Application July 26, 1945, Serial No. 607,196

3 Claims. (Cl. 248—42)

The primary object of this invention is to provide a simple, sturdy and economical holder for fishing rods that may be readily attached to a part of a boat or other support and which securely holds a fishing rod or rods in position yet permits easy release upon a strike.

Another object of the invention is to provide a fishing rod holder adapted to secure a plurality of rods in laterally divergent angularity with respect to each other.

A further object of the invention is to provide the holder with supplemental means to vary the angle of the rods held therein and at the same time additionally secure said rods in position.

Still another object of the invention is to provide a quick releasable clamp for the body of the holder that permits the same to be held in either a horizontal or vertical position.

These and other objects of the present invention will appear as the following description thereof proceeds, and in order to more clearly understand the invention, reference may be had to the accompanying drawing in which an embodiment of the invention is shown.

In the drawings:

Figure 1 is a side elevation of the rod holder in horizontal position partly in section showing the handle portions of a pair of rods positioned therein in dotted lines;

Figure 2 is a top plan view showing two positions of the clamp for the holder in dotted lines;

Figure 3 is a section on the line 3—3 of Figure 1; and

Figure 4 is a side elevation of the rod holder in vertical position.

It is well known that at times it is desirable to support fishing rods other than manually by the fisherman. This is particularly desirable in small boat fishing in rivers or lakes. Attempts have been made heretofore to accomplish this object but the results from a practical viewpoint have not been very satisfactory. This invention by combining the requirements of simplicity, sturdiness and economy in an arrangement of structural elements permitting a range of variability in mounting both the holder and rods satisfies the practical characteristics of a fishing rod holder of this type.

The holder comprises a solid block 1 usually rectangular in shape and of the required length, breadth and thickness to provide a sturdy support for the type of fishing rod used. The block may be made of wood, plastic, metal or any desired material but when made of wood has the advantage of floating on the surface of water which prevents loss in case the holder should accidentally be dropped overboard.

To support the fishing rods, the block 1 is provided with a pair of openings 2 and 3 of any desired shape, usually round, preferably bored through the solid block. These openings are spaced and staggered along the longitudinal axis of the block 1 and at least a portion of each bisects the same. The openings 2 and 3 are laterally and divergently inclined with respect to the longitudinal axis of the block 1 and their axes are arranged at approximately a 90° angle with respect to each other for a purpose to be hereinafter more fully described.

In the embodiment shown, there is illustrated a pair of openings but it is apparent that a plurality of spaced and staggered openings may be employed or it is within the scope of this invention to utilize merely a single opening.

The openings 2 and 3 are of sufficient size to receive the handle portions of fishing rods shown in dotted lines in Figures 1 and 4 which extend clear through the block 1. Usually the fishing rods are provided with reels adjacent the handle portions which act as a stop upon engagement with the face of the block but the angularity of the openings alone which are usually oversized with respect to the rod handles will support the rods therein.

From the arrangement of the openings described in the block 1, it is obvious that when the handle portions of fishing rods are inserted therethrough, the rods will diverge from each other due to the inclination of the openings. The inclination of the axis of the openings and their angle on the longitudinal axis of the block will angle the rods toward the same end of the block but divergently so the lines will be adequately spaced apart.

To additionally secure the rods in the openings and at the same time permit variation of the angle of the same with respect to the block, there is provided for each opening a wedge 4 extending through said opening. The wedges are permanently attached to the holder by a flexible connection such as a chain 5 secured by a screw eye 6 to the top of the wedge at one end and a screw eye 7 in the side of the block at the other end. The screw eyes 7 are arranged on opposite sides of the block.

While it is possible to use this holder without the wedges, as it is contemplated that the openings 2 and 3 are always oversized with respect to the handle portions of the fishing rods to ensure them easy ingress and egress, the use of the wedges assure an easily insertable and removable supplemental securing means for the rods. Furthermore, as the wedges 4 are insertable at various positions around the diameter of the rods in the openings as shown, the angularity of the fishing rods with respect to the holder may be varied or adjusted correspondingly. In other words, the angle of the rods may be changed up or down or sidewise as desired.

To clamp or detachably secure the block of the holder in position, there is provided a U element 8 through one arm of which is mounted a clamping screw 9 having a conventional clamping head 10 in line with a recessed portion 11 in the other arm. The base of the U 8 is positioned in a recessed bottom portion 12 of the block 1 shown in dotted lines in Figure 2 and held by a countersunk bolt 13 extending through the block and above the same. The projecting end of the bolt is screw threaded and has positioned thereon a wing nut 14 which when turned down acts to secure the U-shaped element 8 to the block. This element is usually positioned longitudinally with respect to the block 1 but by loosening the wing nut 14 may be turned at an angle as indicated in Figure 2.

The purpose of providing a clamp of this character that extends at right angles to the body of the holder is that it permits the holder to be secured either horizontally or vertically by the same means. As shown in Figure 1, the rod holder may be detachably clamped to the gunwale G of a boat with the fishing rods inserted through one side of the block 1. As shown in Figure 4, the rod holder may be detachably clamped to the edge of the rear seat S of a row boat. The fishing rods are then inserted through opposite face of the block 1.

In some instances it may be desirable to position the U element 8 at the side of the block 1. For this purpose the sides of the block are recessed as shown at 15 in Figure 1 to receive the base of the U. The bolt 13 is slightly shifted to pass through the cross hole and the clamp secured as previously described.

The rod holder thus described and illustrated may be readily clamped to a boat or other support in either horizontal or vertical position. If lost overboard during positioning or at any other time, if the body 1 is of wood, it will float and will not be lost. When in either position, a fishing rod and landing net may be adequately and easily positioned in or removed from the holder. The arrangement shown eliminates line interference and spaces the rod tips. The use of the permanently attached wedges is a supplemental securing means for the rods in the holder and permits a variation of the angle of the rods as desired.

While the device herein disclosed has been described with more or less particularity, it is to be expressly understood that the invention is not limited to said device or otherwise than by the terms of the appended claims.

I claim:

1. A fishing rod and reel holder including a solid block adapted to be detachably connected to a part of a boat or other support, said block having an inclined opening extending entirely therethrough and oversized with respect to the handle of the rod which is adapted to be inserted and held therein offset with respect to the inclination of the opening, the extent of the insertion of the handle being limited by the reel contact with a face of the block, and supplemental holding means insertable at any point between the oversized opening and handle adapted to vary the angle of the rod with respect to the block.

2. A fishing rod holder including a solid block adapted to be detachably connected to a part of a boat or other support, said block having a pair of inclined openings extending entirely therethrough and oversized with respect to the rod to afford a quick detachable offset securing engagement with the handle end thereof, said oversized openings being laterally and divergently inclined with respect to the longitudinal axis of the block to divergently angle the supported rods, and a tethered wedge for each opening insertible at any point between the oversized opening and rod to vary the angle of the rods with respect to the block and additionally secure the rods therein.

3. A fishing rod holder including a rectangular shaped wooden block, said block having a pair of inclined openings extending entirely therethrough and oversized with respect to the rod to afford a quick detachable offset securing engagement with the handle end thereof, said oversized openings being laterally and divergently inclined to divergently angle the supported rods, and detachable clamping means for said block extending at a right angle to the longitudinal axis of the block and secured to the base or a side of the block.

SIMON P. WAGNER.

REFERENCES CITED

The following references are of record in the file of this patent:

UNITED STATES PATENTS

| Number | Name | Date |
| --- | --- | --- |
| 1,039,554 | Lindhorst | Sept. 24, 1912 |
| 1,162,608 | Hohl et al. | Nov. 30, 1915 |
| 1,551,719 | Williams | Sept. 1, 1925 |
| 2,055,842 | Haislip | Sept. 29, 1936 |
| 2,184,192 | McCline et al. | Dec. 19, 1939 |
| 2,368,385 | Symons | Jan. 30, 1945 |

FOREIGN PATENTS

| Number | Country | Date |
| --- | --- | --- |
| 1,856 | Great Britain | 1895 |